(12) United States Patent
Imai et al.

(10) Patent No.: US 9,436,383 B2
(45) Date of Patent: Sep. 6, 2016

(54) OPERATING DEVICE

(71) Applicants: KABUSHIKI KAISHA TOKAI RIKA DENKI SEISAKUSHO, Aichi (JP); SMK CORPORATION, Tokyo (JP)

(72) Inventors: Takao Imai, Aichi (JP); Hiroaki Fukuoka, Aichi (JP); Osamu Yoshikawa, Tokyo (JP)

(73) Assignees: KABUSHIKI KAISHA TOKAI RIKA DENKI SEISAKUSHO, Aichi (JP); SMK CORPORATION, Tokyo (JP)

( * ) Notice: Subject to any disclaimer, the term of this patent is extended or adjusted under 35 U.S.C. 154(b) by 0 days.

(21) Appl. No.: 14/409,892

(22) PCT Filed: Dec. 25, 2012

(86) PCT No.: PCT/JP2012/083495
§ 371 (c)(1),
(2) Date: Dec. 19, 2014

(87) PCT Pub. No.: WO2014/002316
PCT Pub. Date: Jan. 3, 2014

(65) Prior Publication Data
US 2015/0227310 A1 Aug. 13, 2015

(30) Foreign Application Priority Data

Jun. 26, 2012 (JP) .................................. 2012-142852

(51) Int. Cl.
*G06F 3/045* (2006.01)
*G06F 3/0488* (2013.01)
(Continued)

(52) U.S. Cl.
CPC ........... *G06F 3/04883* (2013.01); *G06F 3/044* (2013.01); *G06F 3/0416* (2013.01); *G06F 3/0418* (2013.01); *G06F 2203/04101* (2013.01); *G06F 2203/04808* (2013.01)

(58) Field of Classification Search
CPC ................................................. G06F 36/04883
USPC ......................................................... 345/174
See application file for complete search history.

(56) References Cited

U.S. PATENT DOCUMENTS

2006/0170660 A1* 8/2006 Miyata ................ G06F 3/03547
345/173
2010/0225604 A1 9/2010 Homma et al.
(Continued)

FOREIGN PATENT DOCUMENTS

CN 102150114 A 8/2011
EP 1659481 A2 5/2006
(Continued)

OTHER PUBLICATIONS

International Search Report PCT/JP2012/083495 dated Mar. 13, 2013.
(Continued)

*Primary Examiner* — Jason Olson
(74) *Attorney, Agent, or Firm* — Roberts Mlotkowski Safran Calderon & Cole, PC

(57) ABSTRACT

Provided is an operating device that suppresses differences in operational feeling resulting from the amount of sensitivity of a detection subject. The operating device (1) includes a touch panel (2) that outputs a first capacitance in accordance with the distance between a finger and an operation surface (20), a determination unit (3) that determines contact to the operation surface (20) by the finger by comparing the first capacitance acquired from the touch panel (2) and a pre-set first threshold (30), a discrimination unit (4) that, after contact has been determined by the determination unit (3), discriminates on the basis of the first capacitance the amount of sensitivity of the finger contributing to the capacitance detected by the touch panel (2), an alteration unit (5) that alters the first threshold (30) to a second threshold (51) on the basis of the amount of sensitivity of the finger discriminated by the discrimination unit (4), and a control unit (6) that detects an operation by the finger by comparing a second capacitance acquired by the touch panel (2) to the second threshold (51) acquired from the alteration unit (5).

5 Claims, 3 Drawing Sheets

(51) Int. Cl.
*G06F 3/044* (2006.01)
*G06F 3/041* (2006.01)

(56) References Cited

U.S. PATENT DOCUMENTS

| | | | | |
|---|---|---|---|---|
| 2011/0248948 | A1* | 10/2011 | Griffin | G06F 3/041 345/174 |
| 2012/0092296 | A1* | 4/2012 | Yanase | G06F 3/0416 345/174 |

FOREIGN PATENT DOCUMENTS

| | | |
|---|---|---|
| EP | 2330486 A1 | 6/2011 |
| JP | 09-245224 | 9/1997 |
| JP | 2006-209684 | 8/2006 |
| JP | 2007-027034 | 2/2007 |
| JP | 2012-104102 | 5/2012 |
| JP | 2012104102 A | 5/2012 |

OTHER PUBLICATIONS

International Preliminary Report on Patentability PCT/JP2012/083495 dated Dec. 25, 2012 (PCTIB338).
Chinese Office Action for Taiwanese application No. 102102018 dated Jan. 21, 2016 with English translation.
Chinese Search Report for Taiwanese application No. 102102018 dated Jan. 20, 2016 with English translation.
Extended European Search Report for European Patent Application No. 12879603.4 dated Nov. 4, 2015.
Japanese Office Action for corresponding Japanese application No. 2012-142852 dated Jun. 21, 2016 and English translation thereof.
Chinese Office Action for corresponding Chinese Patent Application No. 201280073495.X dated Jul. 7, 2016 and English translation thereof.

* cited by examiner

FIG.1A
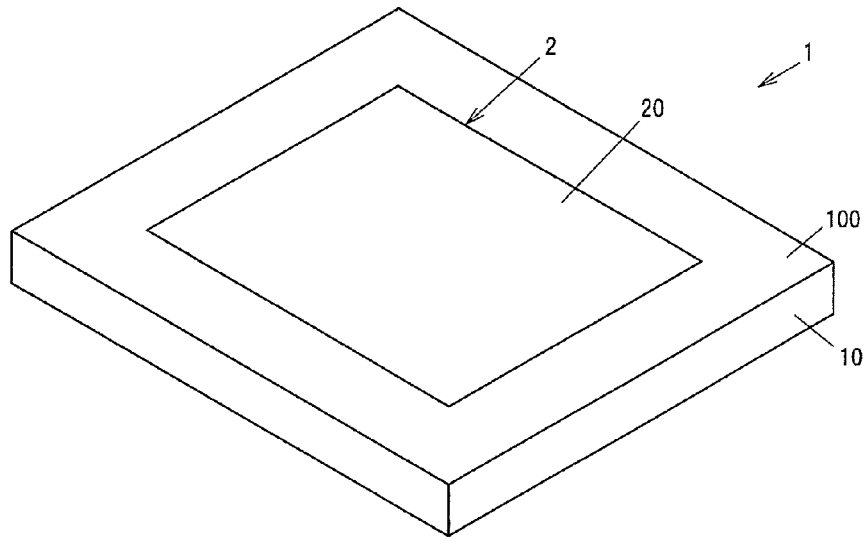
FIG.1B
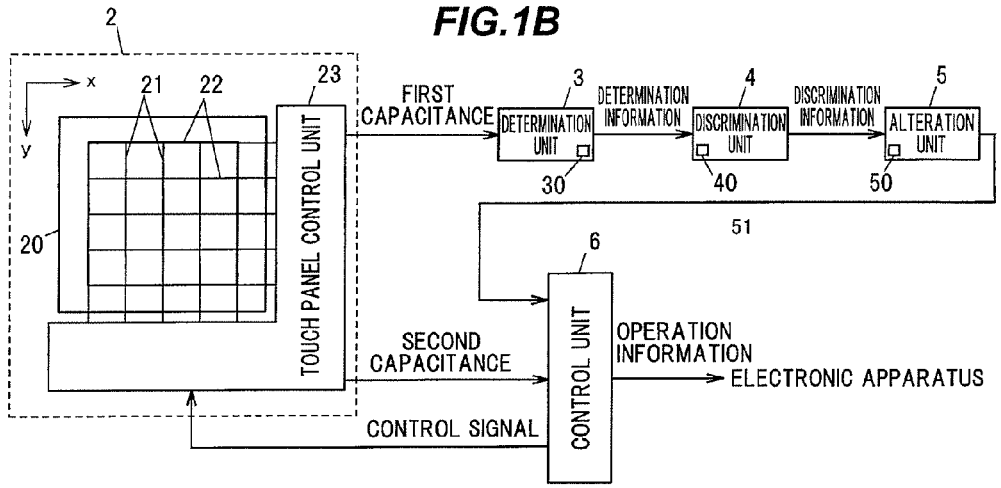
FIG.1C
| TABLE 40 | | | |
|---|---|---|---|
| THICKNESS OF FINGER | THIN | STANDARD | THICK |
| CONTACT AREA S | $S \leq a$ | $a < S < b$ | $b \leq S$ |
FIG.1D
| TABLE 50 | | | |
|---|---|---|---|
| THICKNESS OF FINGER | THIN | STANDARD | THICK |
| SECOND THRESHOLD 51 | A | B | C |

OPERATING DEVICE

TECHNICAL FIELD

An embodiment of this invention relates to an operating device.

BACKGROUND ART

A character input device is known that allows a user to write characters by a finger (see e.g. PTL 1).

The character input device is provided with a touch panel input means, a sensing means for sensing movement of a finger of an operator performing an operation on the touch panel input means, an extraction means for extracting the movement of the finger of the operator performing the operation on the touch panel input means based on the detection result of the sensing means, and a recognition means for recognizing characters input by operator's handwriting based on a path which is traced by the finger of the operator and is extracted by the extraction means. The character input device determines an operation from e.g. a path of the center point of the shadow of the finger sensed by the sensing means and thus can extract the operation even when the finger thickness is different.

CITATION LIST

Patent Literature

[PTL 1] JP-A-H09-245224

SUMMARY OF INVENTION

Technical Problem

When the operator writes characters on the touch panel input means by a finger, the finger may be sometimes off the touch panel input means during performing an operation. Then, it is difficult for the conventional character input device to sense the path of the finger without continuous contact of the finger and thus the characters may not be recognized correctly. Even if the device is provided with a detection means that can detect the operation by the finger being off an operation surface, a distance to detect the operation may vary, e.g., when using a different finger even if the operator is the same and this may cause differences in operational feeling (detection sensitivity).

It is an object of the invention to provide an operating device that prevents the occurrence of the differences in operational feeling (detection sensitivity) resulting from a difference in the amount of sensitivity of a detection object.

Solution to Problem

According to one embodiment of the invention, an operating device is provided that comprises:
  a detecting portion that outputs a first detection value in accordance with a distance between a detection object and an operation surface;
  a determination unit that determines contact to the operation surface by the detection object by comparing the first detection value acquired from the detecting portion and a pre-set first threshold;
  a discrimination unit that, after contact has been determined by the determination unit, discriminate on the basis of the first detection value the amount of sensitivity of the detection object contributing to the detection value detected by the detecting portion;
  an alteration unit that alters the first threshold to a second threshold on the basis of the amount of sensitivity of the detection object discriminated by the discrimination unit; and
  an operation detecting portion that detects an operation by the detection object by comparing a second detection value acquired from the detecting portion to the second threshold acquired from the alteration unit.

Advantageous Effects of Invention

According to one embodiment of the invention, an operating device can be provided that prevents the occurrence of the differences in operational feeling (detection sensitivity) resulting from a difference in the amount of sensitivity of a detection object.

BRIEF DESCRIPTION OF DRAWINGS

FIG. 1A is a perspective view showing an operating device in an embodiment.

FIG. 1B is a block diagram of the operating device.

FIG. 1C is a table stored in a discrimination unit.

FIG. 1D is a table stored in an alteration unit.

DESCRIPTION OF EMBODIMENTS (Summary of Embodiments)

Figure 2A:
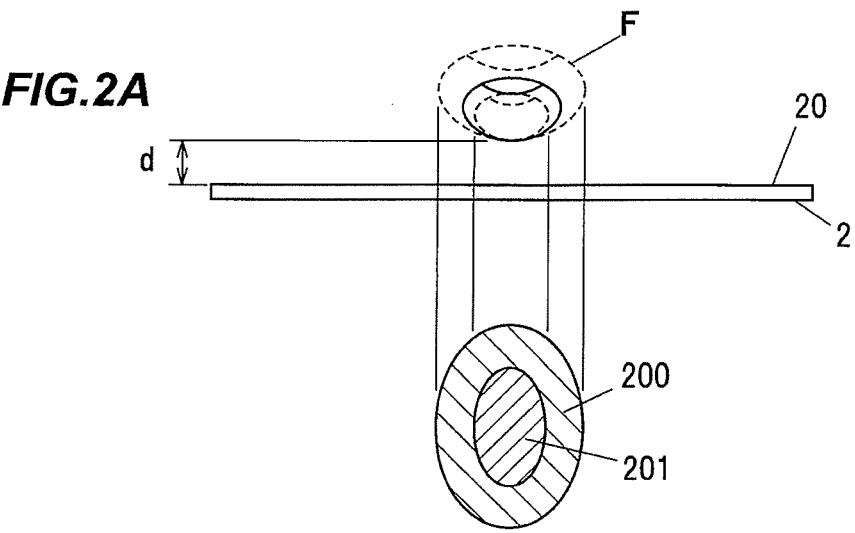
FIG. 2A is a schematic view for explaining sensitivity of the operating device in the embodiment (including a projection view showing a finger projected on an operation surface).

An operating device in the embodiment is provided with a detecting portion which outputs a first detection value in accordance with a distance between a detection object and an operation surface; a determination unit which determines contact to the operation surface by the detection object by comparing the first detection value acquired from the detecting portion and a pre-set first threshold; a discrimination unit which, after contact has been determined by the determination unit, discriminate on the basis of the first detection value the amount of sensitivity of the detection object contributing to the detection value detected by the detecting portion; an alteration unit which alters the first threshold to a second threshold on the basis of the amount of sensitivity of the detection object discriminated by the discrimination unit; and an operation detecting portion which detects an operation by the detection object by comparing a second detection value acquired from the detecting portion to the second threshold acquired from the alteration unit.

[Embodiment]

(Configuration of Operating Device)

FIG. 1A is a perspective view showing an operating device in the embodiment, FIG. 1B is a block diagram of the operating device, FIG. 1C is a table stored in a discrimination unit and FIG. 1D is a table stored in an alteration unit. It should be noted that a component-to-component ratio is sometimes different from the actual ratio in each drawing of the embodiment.

An operating device 1 is capable of operating, e.g., an electronic device connected thereto. The operating device 1 is configured to detect an operation performed by bringing, e.g., a detection object such as a portion of the body of an operator (e.g., a finger) or a special pen, etc., into contact with or detectably close to an operation surface 20 and to be capable of giving instructions according to the operation to, e.g., move a cursor displayed on an electronic device or to select, drag or drop a displayed icon. In other words, an operator can operate the connected electronic device by performing an operation on, e.g., the operation surface 20. In the present embodiment, an operation performed by a finger as a detection object will be described. The term "contact" used herein includes approach of a finger to the operation surface 20 which is detectable by the operating device 1, unless it is necessary to differently express.

In the operating device 1, a touch panel 2 is arranged so that the operation surface 20 is exposed on a surface 100 of a main body 10, as shown in FIG. 1.

Here, the operating device 1 is generally composed mainly of the touch panel 2 as the detecting portion which outputs a first capacitance as the first detection value in accordance with a distance between a finger and the operation surface 20, a determination unit 3 which determines contact of the finger with the operation surface 20 by comparing the first capacitance acquired from the touch panel 2 and a pre-set first threshold 30, a discrimination unit 4 which, after contact has been determined by the determination unit 3, discriminates on the basis of the first capacitance the amount of sensitivity of the finger contributing to the capacitance as a detection value detected by the touch panel 2, an alteration unit 5 which alters the first threshold 30 to a second threshold 51 on the basis of the amount of sensitivity of the finger discriminated by the discrimination unit 4, and a control unit 6 as the operation detecting portion which detects an operation by the finger by comparing a second capacitance as the second detection value acquired from the touch panel 2 to the second threshold 51 acquired from the alteration unit 5.

Here, when the detection object is a finger, the amount of sensitivity of the finger (sensitivity to detect capacitance) varies depending on, e.g., a difference in conductivity or dielectric properties of the body of each individual in addition to the contact area of the finger. In other words, capacitance detected at the time of contact with the operation surface 20 varies with individuals even when the contact area is the same. Therefore, thickness of finger described herein is to take into consideration the amount of sensitivity of the finger, as described later. Here, the thickness of finger without considering the amount of sensitivity means, e.g., a cross sectional area of the detection object which is taken in a contact state of the detection object with the operation surface 20 so as to be cut along a plane parallel to the operation surface 20 at a distance from the operation surface 20 which is given when deciding the first threshold 30. The thickness of the finger herein is an expression including the amount of sensitivity of the finger, unless otherwise specifically mentioned.

(Configuration of Touch Panel 2)

The touch panel 2 in the present embodiment is, e.g., a capacitive touch sensor from which variation in current, which is caused by an approach of the finger to the operation surface 20 and is inversely proportional to a distance between a sensor wire 21/a sensor wire 22 and the finger, is output as a detection signal.

As shown in FIG. 1B, the touch panel 2 is generally composed of sensor wires 21, sensor wires 22 and a touch panel control unit 23.

The sensor wire 21 and the sensor wire 22 are formed of, e.g., ITO (Indium Tin Oxide).

As shown in FIG. 1B, the sensor wires 21 and the sensor wires 22 are aligned in a vertical direction and a horizontal direction of the paper plane. In the present embodiment, the horizontal direction of the paper plane of FIG. 1B is defined as the x-axis, the vertical direction is defined as the y-axis and the upper left of the operation surface 20 of the touch panel 2 is defined as a point of origin. This x-y coordinate system is a first coordinate system.

In the x-axis direction, for example, m sensor wires 21 are aligned at equal intervals. This m is, e.g., a positive integer.

In the y-axis direction, for example, n sensor wires 22 are aligned at equal intervals. This n is, e.g., a positive integer.

The sensor wires 21 aligned along the x-axis are electrically insulated from, e.g., the sensor wires 22 aligned along the y-axis.

The touch panel control unit 23 is configured to sequentially read out capacitances of the sensor wires 21 in the x-axis direction from left to right of the paper plane of FIG. 1B and of the sensor wires 22 in the y-axis direction from top to bottom of the paper plane in this order. The touch panel control unit 23 is configured to read out capacitance based on a control signal output from the control unit 6.

In addition, the touch panel control unit 23 is configured to output the read-out capacitance of, e.g., each sensor wire 21 to the determination unit 3 and the control unit 6.

The touch panel 2 may be configured to additionally include, e.g., a display on the opposite side to the operation surface 20 to display images.

(Configuration of Determination Unit 3)

As shown in FIG. 1B, the determination unit 3 has the first threshold 30. The determination unit 3 is configured to determine contact of finger by comparing the first capacitance acquired from the touch panel 2 to the first threshold 30. The determination unit 3 is configured to, e.g., include the first capacitance, to produce determination information indicating that contact is determined, and to output the determination information to the discrimination unit 4.

As described above, this "contact" includes the approach of the finger to the operation surface 20 to the extent that capacitance reaches the first threshold 30 or more. This is because, for example, when an operator inputs characters to the operation surface 20 by a finger, the finger is not necessarily continuously in contact with the operation surface 20 during performing an operation.

The first capacitance is, e.g., capacitance of not less than the first threshold 30 among capacitances periodically read out by the touch panel 2 based on a control signal from the below-described control unit 6, i.e., is capacitance when the contact is determined. Then, capacitance output from the touch panel 2 after the contact is determined by the determination unit 3 is output as a second capacitance to the control unit 6. A capacitance after determining the termination of the operation is output to the determination unit 3 and is used for determining the contact.

(Configuration of Discrimination Unit 4)

As shown in FIG. 1C, the discrimination unit 4 has a table 40 for associating a contact area S of the finger calculated on the basis of the first capacitance with the finger size, and discriminates the finger thickness on the basis of the contact area S and the table 40. The contact area S is calculated using a well-known method, e.g., a calculation method using coordinates obtained from the capacitance of not less than first threshold 30. For the calculation of the contact area S, distribution of the amount of sensitivity at the plural sensor wires 21 and the sensor wires 21 is taken into consideration.

Alternatively, the discrimination unit 4 may be configured such that an average contact area during detection of contact of the finger conducted by the touch panel 2 is defined as the contact area S. In this case, the determination unit 3 calculates an average of plural contact areas during the period from when the contact of the finger with the operation surface 20 is determined to when the moving away of the finger is determined, and then defines the average as the contact area S.

The table 40 and a below-described table 50 may be obtained by, e.g., experiments and simulations etc. The discrimination unit 4 and the alteration unit 5 are not limited to, e.g., the ones having the configuration using the table 40 and the table 50 and may be configured to derive the second threshold 51, etc., by calculation.

The table 40 is to associate, e.g., the calculated contact area S of the finger with the finger thickness, as shown in FIG. 1C. When the contact area S is, e.g., not more than a (S≤a), it is discriminated that the finger thickness is "thin". When the contact area S is, e.g., more than a and less than b (a<S<b), it is discriminated that the finger thickness is "standard". When the contact area S is, e.g., not less than b (b≤S), it is discriminated that the finger thickness is "thick". Here, a, b and c are more than 0 (0<a, b, c). a, b and c are determined by, e.g., experiments and simulations using model fingers with respective thicknesses as described above. From the discrimination unit 4, the discrimination results are output as discrimination information to the alteration unit 5.

(Configuration of Alteration Unit 5)

Figure 2B:
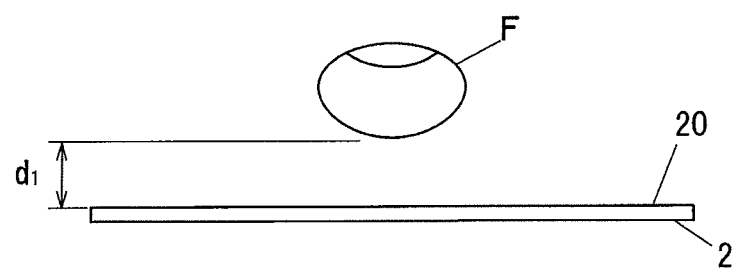
FIG. 2B is a schematic view for explaining sensitivity in Comparative Example when a finger is thick.
Figure 2C:
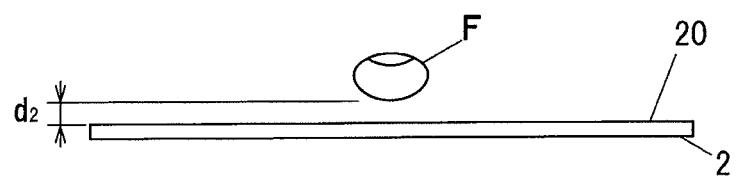
FIG. 2C is a schematic view for explaining sensitivity in Comparative Example when a finger is thin.

FIG. 2A is a schematic view for explaining sensitivity of the operating device in the embodiment (including a projection view showing a finger F projected on the operation surface), FIG. 2B is a schematic view for explaining sensitivity in Comparative Example when the finger F is thick, and FIG. 2C is a schematic view for explaining sensitivity in Comparative Example when the finger F is thin.

The alteration unit 5 is configure to alter the first threshold 30 to the second threshold 51 on the basis of the finger thickness discriminated by the discrimination unit 4.

Here, capacitance is inversely proportional to a distance between the operation surface 20 and the finger F and is proportional to the thickness of the finger F. In other words, the capacitance is proportional to the thickness of the finger F when the distance from the operation surface 20 is the same. Therefore, the operation may be or may not be detected depending on the thickness of the finger F even when the distance from the operation surface 20 is the same. The thickness of the finger F is determined by taking into consideration the amount of sensitivity.

In detail, when a distance d from the operation surface 20 to the finger F is the same, an area of a projection image 200 of a thick finger F projected on the operation surface 20 is larger than an area of a projection image 201 of a thin finger F, as shown in FIG. 2A. Therefore, when a threshold used for determining the contact is fixed, there is a possibility that contact of the thick finger F can be determined at a distance $d_1$ from the operation surface 20 as shown in Comparative Example of FIG. 2B but contact of the thin finger F cannot be determined until a distance $d_2$ which is shorter than the distance $d_1$ as shown in Comparative Example of FIG. 2C. The projection image 200 and the projection image 201 are images of a portion contributing to capacitance projected on the operation surface 20.

Therefore, when a distance allowing detection of the operation is different depending on the thickness of the finger F as shown in FIGS. 2B and 2C, operational feeling varies by using a different finger even if the operator is the same, hence, poor operational feeling.

The operating device 1 is thus configured so that the thickness of the finger contributing capacitance detected by the touch panel 2 is discriminated based on the first capacitance, the first threshold 30 is altered according to the discriminated finger thickness and an operation is detected at substantially the same distance d as shown in FIG. 2A with any finger thicknesses. The finger thickness is calculated by taking into consideration the amount of sensitivity.

The alteration unit 5 alters the second threshold 51 to "A" based on the table 50 when the discriminated finger thickness is "thin". Meanwhile, the alteration unit 5 alters the second threshold 51 to "B" based on the table 50 when the discriminated finger thickness is "standard". Furthermore, the alteration unit 5 alters the second threshold 51 to "C" based on the table 50 when the discriminated finger thickness is "thick". A, B and C here are, e.g., positive numbers which satisfy a relation of A<B<C.

The categories of the finger thickness to be discriminated are not limited to the above-mentioned three types and may be less or more. Alternatively, the finger thickness to be discriminated may be calculated according to the contact area.

(Configuration of Control Unit 6)

The control unit 6 is, e.g., a microcomputer composed of a CPU (Central Processing Unit) performing calculation and processing, etc., of the acquired data according to a stored program, a RAM (Random Access Memory) and a ROM (Read Only Memory) which are semiconductor memories. The ROM stores e.g. a program for operation of the control unit 6. The RAM is used as, e.g., a storage area for temporarily storing calculation results, etc. In addition, the control unit 6 has, inside thereof, a means for generating clock signals and is operated based on the clock signals.

The control unit 6 is configured to detect an operation performed by a finger by comparing the second capacitance acquired from the touch panel 2 to the second threshold 51 acquired from the alteration unit 5.

In addition, the control unit 6 is configured to, e.g., calculate coordinates of the portion operated on the operation surface 20 based on the second capacitance of not less than second threshold 51 and to output the coordinates as operation information to the connected electronic device. The coordinates are calculated at a predetermined cycle according to the clock signal, in the same manner as the readout of capacitance. In addition, the control unit 6 is configured to generate a control signal at the predetermined cycle and then to output the control signal to the touch panel control unit 23.

Figure 3:
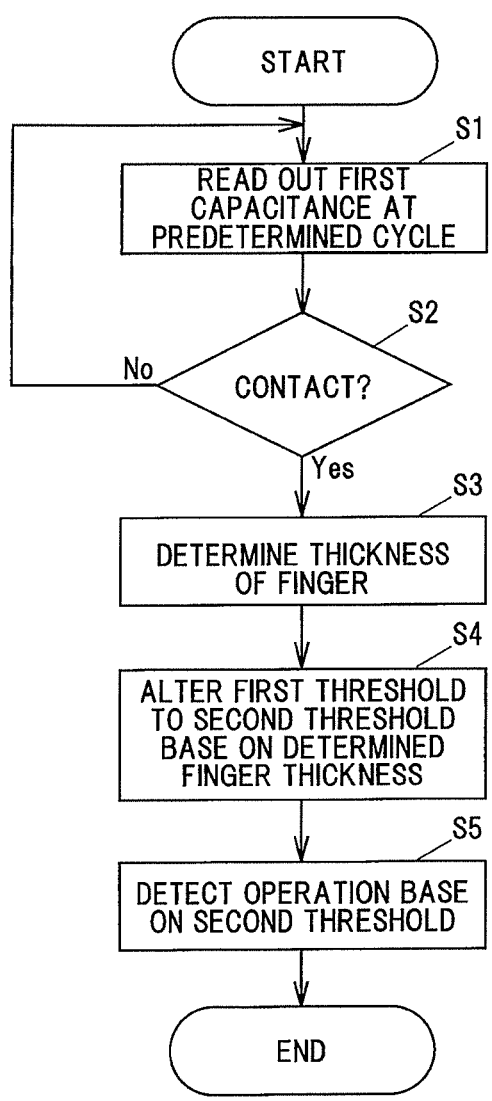
FIG. 3 is a flowchart for explaining an operation of the operating device in the embodiment.

The operation of the operating device 1 in the embodiment will be described below in accordance with the flow-chart of FIG. 3 while also referring to each drawing.

(Operation)

The control unit 6 generates a control signal at a predetermined cycle and then outputs the control signal to the touch panel control unit 23. The touch panel control unit 23 reads out the first capacitance based on the acquired control signal (S1) and then outputs the first capacitance to the determination unit 3.

The determination unit 3 determines presence of contact based on the acquired first capacitance and the first threshold 30. Once the contact of the finger is determined, i.e., when "Yes" is applicable in Step 2 (Yes: S2), the determination unit 3 produces determination information which is then output to the discrimination unit 4.

The discrimination unit 4 discriminates the finger thickness based on the acquired determination information and the table 40 (S3). Once the finger thickness is discriminated, the discrimination unit 4 subsequently produces discrimination information which is then output to the alteration unit 5.

The alteration unit 5 alters the first threshold 30 to the second threshold 51 based on the acquired discrimination information and the table 50 and then outputs the second threshold 51 to the control unit 6 (S4).

The control unit 6 detects an operation by comparing the acquired second threshold 51 to the second capacitance acquired from the touch panel 2 (S5), and then calculates coordinates of the position where the contact is detected. Following this, the control unit 6 produces operation information including information of the calculated coordinates and then outputs the operation information to the electronic device. The control unit 6 detects an operation by comparing the capacitance acquired at each cycle to the second threshold 51 and continuously produces and outputs operation information as long as the operation continues. This series of processes is continuously performed during that the operating device 1 is on.

Effects of the Embodiment

The operating device 1 in the present embodiment can suppress differences in operational feeling resulting from the amount of sensitivity of the detection object. In the operating device 1, the amount of sensitivity of the finger contributing to the capacitance detected by the touch panel 2 is discriminated based on the first capacitance and a threshold for detecting the operation is altered according to the discriminated amount of sensitivity of the finger. Therefore, in the operating device 1, variation in the distance from the operation surface 20 to detect the operation, which is caused by a difference in the amount of sensitivity of the finger, is suppressed and differences in operational feeling are thus suppressed.

The operating device 1 includes the table 40 for discriminating the finger thickness based on the contact area S calculated by taking into consideration the amount of sensitivity and the table 50 for setting the second threshold 51 based on the finger thickness. Therefore, as compared to calculation from the capacitance, the load on the control unit 6 is reduced and the processing speed is fast. In addition, the operating device 1 can be manufactured at low cost since it is not necessary to provide a control unit performing sophisticated processing as described above.

The operating device 1 detects contact and approach to the operation surface 20 based on the second threshold 51 regardless of the finger thickness. Therefore, unlike the device which detects only the contact, characters, etc., written on the operation surface 20 still can be detected even when the finger is off from the operation surface 20 during performing an operation, and detection accuracy of the performed operation is improved.

Although some embodiments of the invention have been described above, these embodiments are merely an example and the invention according to claims is not to be limited thereto. These new embodiments can be implemented in various other forms, and various omissions, substitutions and changes, etc., can be made without departing from the gist of the invention. In addition, all combinations of the features described in these embodiments are not necessary to solve the problem of the invention. Further, these embodiments are included within the scope and gist of the invention and also within the invention described in the claims and the range of equivalency.

INDUSTRIAL APPLICABILITY

This invention can be applied to an operating device in which the operational feeling (detection sensitivity) may vary due to a difference in the amount of sensitivity of a detection object.

REFERENCE SIGNS LIST

1 Operating device
2 Touch panel
3 Determination unit
4 Discrimination unit
5 Alteration unit
6 Control unit
10 Main body
20 Operation surface
21 Sensor wire
22 Sensor wire
23 Touch panel control unit
30 First threshold
40 Table
50 Table
51 Second threshold
100 Surface
200 Projection image
201 Projection image

The invention claimed is:

1. An operating device, comprising:
a detecting portion formed from a touch panel having an operation surface that outputs a first detection value in accordance with a distance between a detection object and the operation surface;
a determination circuit that determines contact to the operation surface by the detection object by comparing the first detection value acquired from the detecting portion and a pre-set first threshold;
a discrimination circuit that, after contact has been determined by the determination circuit, discriminates on the basis of the first detection value the amount of sensitivity of the detection object contributing to the detection value detected by the detecting portion;
an alteration circuit that alters the first threshold to a second threshold on the basis of the amount of sensitivity of the detection object discriminated by the discrimination circuit; and
an control unit that detects an operation by the detection object by comparing a second detection value acquired from the detecting portion to the second threshold acquired from the alteration circuit,
wherein different areas of the operating surface of the touch panel are contacted with detection objects having different contact areas;
wherein the discrimination circuit associates the different contact areas of the detection objects on the operation surface of the touch panel with different distances between the detection objects and the touch panel that result in the outputting of the first detection values, and wherein the alteration circuit alters the first threshold to a second threshold such that the different distances become a substantially same distance.

2. The operating device according to claim 1, wherein the discrimination circuit comprises a table for associating a contact area of the detection object on the operation surface of the touch panel calculated on the basis of the first detection value with the amount of sensitivity of the detection object, and discriminates the amount of sensitivity of the detection object on the basis of the contact area and the table.

3. The operating device according to claim 1, wherein the control unit calculates coordinates based on contact or approach of the detection object when a second detection value is not less than the second threshold.

4. The operating device according to claim 2, wherein, in the discrimination circuit, an average value of contact area during detection of contact of the detection object conducted by the detecting portion is defined as the contact area of the detection object on the operation surface of the touch panel.

5. The operating device according to claim 2, wherein the control unit calculates coordinates based on contact or approach of the detection object when a second detection value is not less than the second threshold.

* * * * *